(12) United States Patent
Kwon et al.

(10) Patent No.: US 6,747,709 B2
(45) Date of Patent: Jun. 8, 2004

(54) OPTICAL SYSTEM OF LIQUID CRYSTAL PROJECTOR USING LIQUID CRYSTAL DISPLAYS

(75) Inventors: Soon Hyung Kwon, Seoul (KR); Man Ho Na, Suwon-shi (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 09/983,744

(22) Filed: Oct. 25, 2001

(65) Prior Publication Data
US 2002/0051100 A1 May 2, 2002

(30) Foreign Application Priority Data
Oct. 26, 2000 (KR) ...................... P2000-63211

(51) Int. Cl.[7] ................. G02F 1/1335; G03B 21/14
(52) U.S. Cl. ............. 349/9; 349/5; 349/8; 353/34
(58) Field of Search ............... 349/5, 8, 9; 353/30, 353/34

(56) References Cited

U.S. PATENT DOCUMENTS

| 5,990,996 | A | | 11/1999 | Sharp ...................... 349/119 |
|---|---|---|---|---|
| 6,176,586 | B1 | * | 1/2001 | Hirose et al. ............. 353/31 |
| 6,183,091 | B1 | * | 2/2001 | Johnson et al. ........... 353/20 |
| 6,247,814 | B1 | * | 6/2001 | Lin .......................... 353/20 |
| 6,273,567 | B1 | * | 8/2001 | Conner et al. ............ 353/20 |
| 6,343,864 | B1 | * | 2/2002 | Tajiri ....................... 353/20 |
| 6,402,323 | B1 | * | 6/2002 | Shiue et al. ............... 353/20 |
| 6,419,362 | B1 | * | 7/2002 | Ikeda et al. ............... 353/20 |
| 6,454,416 | B2 | * | 9/2002 | Aoto et al. ................ 353/31 |

FOREIGN PATENT DOCUMENTS

| JP | 11202432 | 7/1999 |
|---|---|---|
| JP | 11271683 | 10/1999 |

* cited by examiner

Primary Examiner—Robert H. Kim
Assistant Examiner—Andrew Schechter
(74) Attorney, Agent, or Firm—Fleshner & Kim, LLP

(57) ABSTRACT

An optical system of a liquid crystal projector that is capable of reducing a full length of the optical system including three reflective liquid crystal display panels. In the system, an illuminating unit allows a white light generated from a light source to have any one linear polarized light and a uniform light distribution. A color separator separates the white light from the illuminating unit in accordance with a wavelength band to obtain a first color light, and polarization-converts the remaining lights in accordance with a wavelength band and then separates them into second and third color lights depending on their polarization components. First to third liquid crystal display panels uses the first to third color lights from the color separator to implement first to third color pictures, respectively. A picture combining unit combines the first to third color lights having acquired picture information from the first to third liquid crystal display panels. A projection lens unit projects the combined picture from the picture combining unit onto a screen on an expanded scale. Accordingly, the optical system can reduce the number of optical elements.

12 Claims, 4 Drawing Sheets

OPTICAL SYSTEM OF LIQUID CRYSTAL PROJECTOR USING LIQUID CRYSTAL DISPLAYS

BACKGROUND OF THE INVENTION

1. Field of the Invention

This invention relates to a liquid crystal projector, and more particularly to an optical system of a liquid crystal projector that is capable of minimizing the size and the number of optical elements of an optical system using three reflective liquid crystal displays.

2. Description of the Related Art

Nowadays, there has been highlighted a flat panel display that is capable of replacing a cathode ray tube display having a limit in the size of screen and a large system size and realizing both a thin thickness and a large-scale screen. The flat panel display includes a projector that projects a small-field picture onto a large screen on an expanded scale.

The projector employs a cathode ray tube or a liquid crystal display (LCD) as a display device for implementing a small-field picture. Recently, there has been mainly used the LCD to keep up with a trend toward a thin thickness of the projector. Generally, a liquid crystal projector adopts a transmissive or reflective LCD. The liquid crystal projector has been developed with intent to obtain small bulk, low weight and high brightness, whereas an LCD panel has been developed with intent to obtain high aperture ratio and high resolution. Thus, there has been used the reflective LCD panel so as to keep up with a recent trend toward a liquid crystal projector realizing high resolution, small bulk and low cost.

The liquid crystal projector takes advantage of a light emitting from a light source to implement a picture on the LCD panel. The liquid crystal projector images a picture of the LCD panel onto a screen using a projective optical system to observe a picture imaged on the screen. When the projector is implemented by directly projecting a picture of the LCD panel onto a rear screen, a projection distance should be assured between the screen and the projective optical system. Accordingly, since the rear side of the screen requires a relatively large space to enlarge a thickness of the projector, it is difficult to obtain a thin thickness of the projector.

In order to solve this problem, a reflecting mirror is introduced between the screen and the projective optical system to change a light path, thereby reducing a thickness of the projector. However, since an arrangement angle of the reflecting mirror has to be more than a critical angle thereof so as to project a picture onto the rear screen without any distortion, there is a limit in reducing a thickness of the system. Also, there is a limit in reducing a thickness of the system due to an inherent full length of an optical system consisting of an illumination system, the LCD and the projective lens system of the projector.

Referring to FIG. 1, there is shown an optical system of a conventional liquid crystal projector. The liquid crystal projector includes first and second fly eye lenses (FEL's) 6 and 8, a polarizing beam splitter (PBS) array 10 and a first condensing lens 12 arranged between a light source 4 and a full-reflecting mirror 14, and a second condensing lens 16 arranged between the full-reflecting mirror 14 and a first Dichroic mirror 18.

A white color light emitting from a lamp of the light source 4 is reflected by a parabolic mirror to be progressed toward the first FEL 6. The first FEL 6 divides an incident light into the cell units and allows them to be focused onto each lens cell of the second FEL 8. The second FEL 8 converts an incident light into a parallel light for a specific portion and transmits the same to the PBS array 10. The PBS array 10 separates an incident light into linear polarized lights having any one light axis, that is, a P-polarized light and a S-polarized light. Then, a half wavelength plate (not shown) partially attached to the rear side of the PBS array 10 converts the transmitted P-polarized light into a S-polarized light. Thus, all incident lights are converted into S-polarized lights by means of the PBS array 10, thereby permitting most lights emitting from the light source 4 to be incident to picture implementing elements 26R, 26G and 26B of the LCD panel.

The first condensing lens 12 focuses an incident light from the PBS array 10 onto the full-reflecting mirror 14. The full-reflecting mirror 14 makes a full reflection of an incident light from the first condensing lens 12 and allows the same to be progressed toward the second condensing lens 16. The second condensing lens 16 focuses an incident light from the full-reflecting mirror 14 onto the first Dichroic mirror 18. The first Dichroic mirror 18 transmits a light at a blue color area in the incident lights while reflecting lights at a green color area and at a red color area having a larger wavelength than a blue light.

Further, the optical system of the liquid crystal projector shown in FIG. 1 includes a second Dichroic mirror 20, a first polarizing film 22R and a first polarizing beam splitter prism (PBSP) 24R arranged between the first Dichroic mirror 18 and the red LCD panel 26R, a second polarizing film 22G and a second PBSP 24G arranged between the second Dichroic mirror 20 and the green LCD panel 26G, a first relay lens 27, a second full-reflecting mirror 28, a second relay lens 29, a third polarizing film 22B and a third PBSP 24B arranged between the first Dichroic mirror 18 and the blue LCD panel 26B, a Dichroic prism 30 arranged among the first to third PBSP's 24R, 24G and 24B, and a projection lens 32 installed in opposition to an light output surface of the Dichroic prism 30.

The second Dichroic mirror 20 reflects a light at the blue area in lights reflected from the first Dichroic mirror 18 and being incident thereto to progress it toward the second polarizing film 22G while transmitting a light a the red area to progress it toward the first polarizing film 22R. The second full-reflecting mirror 28 reflects a light at the blue area transmitted from the first Dichroic mirror 18 and being incident thereto to progress it toward the third polarizing film 22B.

The first and second relay lenses 27 and 29 are field lenses, which relay an imaging point of a light at the blue area to re-image the blue light onto the blue LCD panel 26B. Each of the first to third polarizing films 22R, 22G and 22B transmits only a S-polarized light parallel to its optical axis in the incident lights and allows it to be progressed toward the first to third PBSP's 24R, 24G and 24B, respectively.

The first to third PBSP's 24R, 24G and 24B reflects red, green and blue S-polarized lights transmitted from the first to third polarizing films 22R, 22G and 22B and being incident thereto and allows them to be progressed into the red, green and blue LCD panels 26R, 26G and 26B, respectively. Further, the first to third PBSP's 24R, 24G and 24B obtain picture information from the red, green and blue LCD panel 26R, 26G and 26B to transmit red, green and blue lights converted into P-polarized lights, respectively and allows them to be progressed toward the Dichroic prism 30.

Each of the red, green and blue LCD panels 26R, 26G and 26B is a reflective LCD panel, which converts a S-polarized light reflected from each of the first to third PBSP 24R, 24G and 24B and being incident thereto into a P-polarized light to thereby implement a picture.

The Dichroic prism 30 obtains picture information from the red, green and blue LCD panels 26R, 26G and 26B to combine the incident red, green and blue lights and output the combined light to the projection lens 32. First and second polarization converting films (not shown) for converting P-polarized lights from the first and third PBSP's 24R and 24B into S-polarized lights are arranged between the first and third PBSP's 24R and 24B and the Dichroic prism 30, respectively. Accordingly, the Dichroic prism 30 reflects red and blue lights having a S-polarization component being inputted via the first and second polarization converting films into the projection lens 32. At the same time, the Dichroic prism 30 transmits a red light having a P-polarization component inputted via the second PBSP 24G into the projection lens 32, to thereby combine the red, green and blue lights. The projection lens 32 magnifies a picture being inputted from the Dichroic prism 30 and projects it onto the screen.

The conventional liquid crystal projector having as described above requires a plurality of Dichroic mirrors to separate a white light from the light source into red, green and blue colors because of an adoption of three LCD panels. Also, since the conventional liquid crystal projector uses a reflective LCD panel, it requires a plurality of PBSP's differentiating paths of input and output lights on a basis of that reflective LCD panel. As an optical system of the conventional liquid crystal projector employing three reflective LCD panels requires a large number of optical elements, the size of the optical system is enlarged. Particularly, since the optical system has an inherent full length L, it has a limit in reducing a thickness thereof proportional to said inherent full length L. Thus, it becomes difficult to realize a thin thickness of the optical system.

Accordingly, there has been suggested an optical system that has a two-layer structure in which a color separator is arranged at the upper layer of the color-combining part and the projecting lens system so as to reduce a full length L of the optical system. However, the two-layer structure optical system also employs a large number of optical elements to have a limit in reducing its size.

SUMMARY OF THE INVENTION

Accordingly, it is an object of the present invention to provide an optical system of a liquid crystal projector that is capable of reducing the number of optical elements as well as the size of the optical system.

In order to achieve these and other objects of the invention, an optical system of a liquid crystal projector according to an embodiment of the present invention includes an illuminating unit for allowing a white light generated from a light source to have any one linear polarized light and a uniform light distribution; a color separator for separating the white light from the illuminating unit in accordance with a wavelength band to obtain a first color light and for polarization-converting the remaining lights in accordance with a wavelength band and then separating them into second and third color lights depending on their polarization components; first to third liquid crystal display panels using the first to third color lights from the color separator to implement first to third color pictures, respectively; a picture combining unit for combining the first to third color lights having acquired picture information from the first to third liquid crystal display panels; and a projection lens unit for projecting the combined picture from the picture combining unit onto a screen on an expanded scale.

In the optical system, the color separator includes a first Dichroic mirror for separating the white light in accordance with a wavelength band and allowing the separated first color light to be progressed toward the first liquid crystal display panel; and a first color selector for polarization-converting the remaining lights from the first Dichroic mirror in accordance with a wavelength band to differentiate polarization components of the second and third color lights. The optical system further includes a first polarized light separating prism for separating the second and third color lights from the first color selector in accordance with a polarization direction and allowing them to be progressed toward the second and third liquid crystal display panels, respectively.

Particularly, each of said first to third liquid crystal display panels is a reflective liquid crystal display panel for converting and outputting a polarization component of an incident light depending on the picture information; and said first polarized light separating prism for allowing the second and third color lights polarization-converted by acquiring picture information from the second and third liquid crystal display panels to be progressed into the picture combining unit. The optical system further includes a second polarized light separating prism for allowing the first color light from the Dichroic mirror to be incident to the first liquid crystal display panel and allowing the first color light polarization-converted by acquiring picture information from the first liquid crystal display panel to be progressed toward the picture combining unit.

In the optical system, the picture combining unit further includes any one of a third polarized light separating prism and a Dichroic prism for acquiring picture information from the first to third liquid crystal display panels to combine the first to third color lights being incident thereto via the first and second polarized light separating prisms and output the combined light.

The picture combining unit further includes a second color selector for selectively converting polarization components of the second and third color lights outputted from the first polarizing prism in accordance with a wavelength band and allowing it to be progressed toward any one of the third polarized light separating prism and the Dichroic prism in the same linear polarized state.

In the optical system, the first and second color selectors make a polarization conversion of the red light while transmitting the light at other wavelength band as it is.

The optical system further includes a half wavelength plate for converting a linear polarized light of the first color light having acquired the picture information from the second polarizing prism and allowing it to be progressed toward any one of the third polarized light separating prism and the Dichroic prism.

The optical system further includes a third color selector for polarization-converting the combined picture from the picture combining unit in accordance with a wavelength band and allowing it to be progressed toward the projection lens.

Herein, if a P-polarization screen for transmitting only a P-polarized light is applied to said screen, then the third color selector allows all lights going between the picture combining unit and the projection lens unit to be converted into P-polarized lights.

In example of another system, the picture combining unit includes a second Dichroic mirror for selectively reflecting and transmitting the first to third color lights from the first and second polarized light separating prisms in accordance with a wavelength band to combine a picture.

The optical system further includes first and second color light filters arranged between the second and third liquid crystal display panels and the first polarized light separating prism, respectively to enhance color purity.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 2:
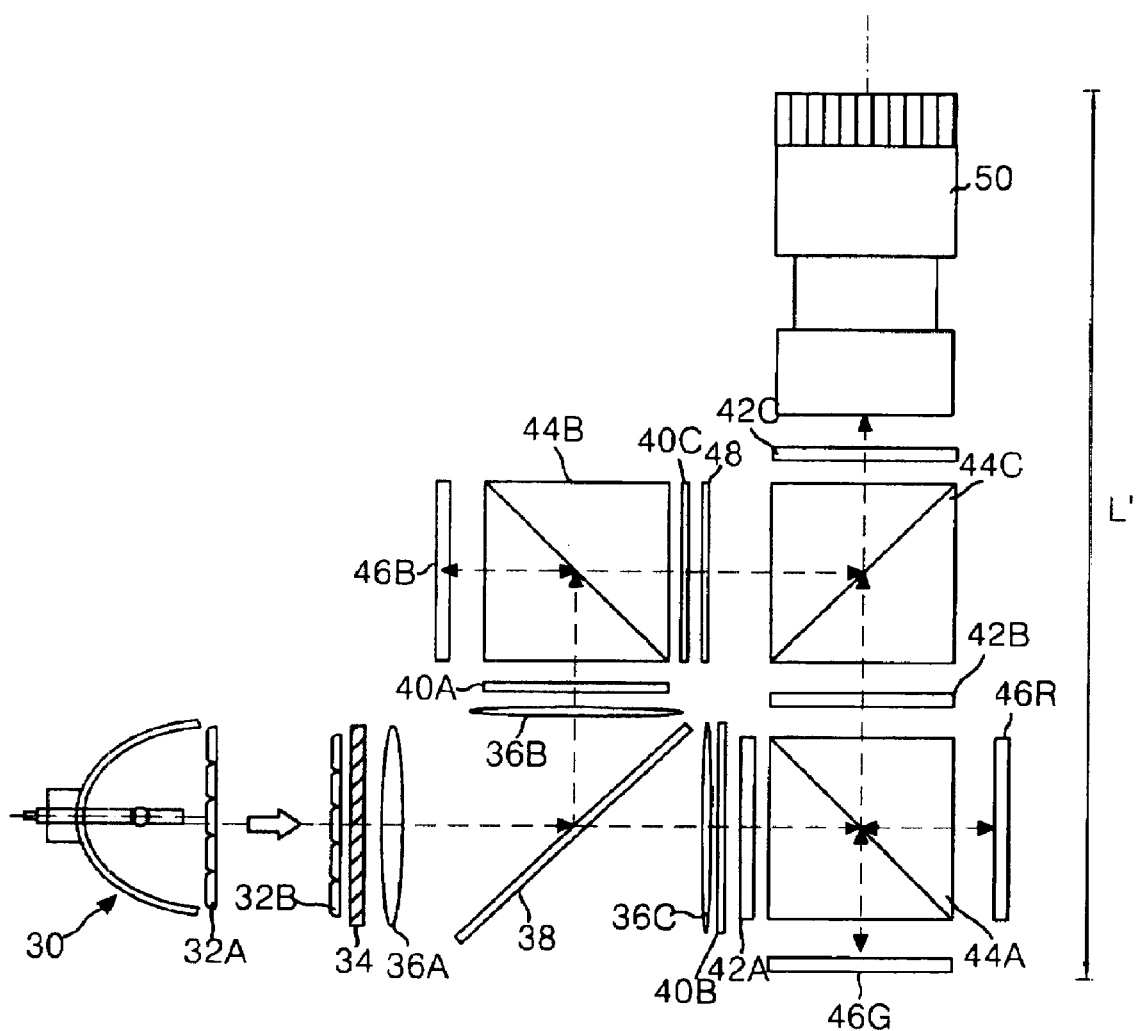
FIG. 2 is a plan view showing a configuration of an optical system of a liquid crystal projector according to an embodiment of the present invention.

Referring to FIG. 2, there is shown an optical system of a liquid crystal projector according to an embodiment of the present invention.

The optical system includes three reflective LCD panels 46R, 46G and 46B for displaying a picture, an illuminating unit for allowing a white light from a light source 30 to be uniformly and efficiently irradiated onto the LCD panels 46R, 46G and 46B, a color separator for spatially separating a white light from the illuminating unit into red, green and blue color lights and allowing the separated color lights to be the reflective LCD panels 46R, 46G and 46B, a light combining unit for combining three color lights obtaining picture information from the reflective LCD panels 46R, 46G and 46B, and a projection lens 50 for magnifying and projecting the combined picture.

The illuminating unit consists of the light source 30, first and second FEL's 32A and 32B and a PBS array 34. The color separator includes a Dichroic mirror 38, a first color-selective polarization-converting device 42, hereinafter referred to as "color selector" for making a polarization conversion in accordance with a wavelength area, and a first PBSP 44A. The light combining unit consists of said first PBSP 44A, a second PBSP 44B, a second color selector 42B and a third PBSP 44C.

A white color light emitting from the light source 30 goes toward the first FEL 32A. The first FEL 32A divides an incident light into the cell units and allows them to be focused onto each lens cell of the second FEL 32B. The second FEL 32B converts an incident light into a parallel light for a specific portion. The PBS array 34 is integral to the second FEL 32B to separate an incident light into a P-polarized light and a S-polarized light. Then, a half wavelength ($\lambda/2$) plate (not shown) partially attached to the rear side of the PBS array 34 converts the transmitted P-polarized light into a S-polarized light. The first condensing lens 36A focuses an incident light. Such an illuminating unit converts all incident lights into a linear polarized light in any one direction, that is, a S-polarized light in such a manner to be uniformly incident to the LCD panels 46R, 46G and 46B, thereby improving a light efficiency.

The first Dichroic mirror 38 selectively reflects or transmits an incident light from the illuminating unit in a wavelength area. For instance, the first Dichroic mirror 38 transmits a light at a blue color area in the incident lights while reflecting lights at a green color area and at a red color area having a larger wavelength than said light at the blue color area.

Figure 3:
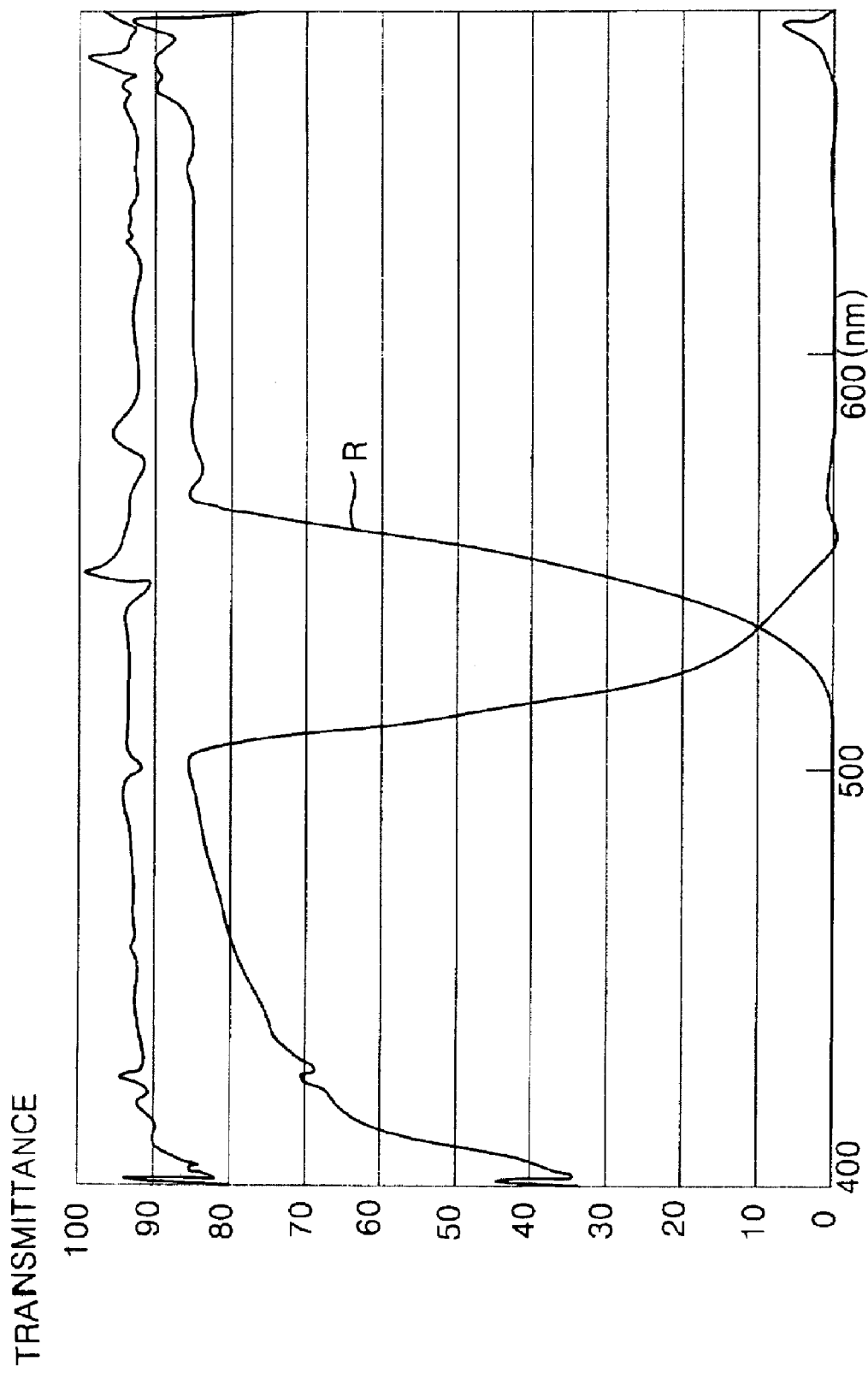
FIG. 3 is a transmission characteristic diagram of the first color selector shown in FIG. 2.

The first color selector 42A make a selective polarization conversion of lights at the red and green areas transmitting the first Dichroic mirror 38 and being incident thereto in accordance with a wavelength area. For instance, the first color selector 42A rotates a light at the blue area at 90° to convert a S-polarized light into a P-polarized light while transmitting a light at the red area with keeping a S-polarization state as it is. The first color selector 42A is most preferably designed such that it makes a polarization conversion of a red light R having a good transmittance characteristic after polarization conversion as can be seen from a transmission characteristic diagram of the color selector shown in FIG. 3. Such a first color selector 42A making a selective polarization conversion according to a wavelength area has been disclosed in U.S. Pat. No. 5,990, 996.

A transmitted light output side and a reflected light output side of the Dichroic mirror 38 are further provided with condensing lenses 36B and 36C and S polarizers 40A and 40B, respectively. The condensing lenses 36B and 36C focuses a light and the S polarizers 40A and 40B, thereby enhancing a purity of the S-polarized light.

The first PBSP 44A transmits a P-polarized light at the red area polarization-converted by means of the first color selector 42A and being incident thereto toward the red LCD panel 46R while reflecting a S-polarized light at the green area being incident thereto as it is into the red LCD panel 46G. Further, the first PBSP 44A reflects a S-polarized light at the red area polarization-converted by acquiring picture information from the red LCD panel 46R and being incident thereto into the third PBSP 44C while transmitting a P-polarized light at the green area polarization-converted by acquiring picture information from the red LCD panel 46G and being incident thereto toward the third PBSP 44C.

The second PBSP 44B reflects a S-polarized light at the blue area reflected from the Dichroic mirror 38 and being incident thereto into the blue LCD panel 46B while transmitting a blue light converted into a P-polarized light by acquiring picture information from the blue LCD panel 46B toward the third PBSP 44C.

Each of the red, green and blue LCD panels 46R, 46G and 46B is a reflective LCD panel, which polarization-converts and outputs a line-polarized light being incident thereto to implement the corresponding color picture.

The transmitted light output side of the second PBSP 44B is further provided with a P polarizer 40C and a half wavelength ($\lambda/2$) plate 48. The P polarizer 40C transmits only a P-polarized light to enhance a purity of a P-polarized light acquiring green picture information. The half wavelength plate 48 converts an incident P-polarized light into a S-polarized light.

The second color selector 42B selectively polarization-converts an incident light from the first PBSP 44A in accordance with a wavelength area in similarity to the fore-mentioned first color selector 42A. More specifically, the second color selector 42B transmits a green P-polarized light acquiring picture information as it is while rotating a red S-polarized light acquiring picture information at 90° to output it as a P-polarized light.

The third PBSP 44C combines incident red, green and blue lights acquiring picture information and output them to a projection lens unit 50. In other words, the third PBSP 44C reflects a blue light converted into a S-polarized light by means of the half wavelength plate 48 and being incident thereto into the projection lens 50 while transmitting a red light converted into a P-polarized light by means of the second color selector 42B and being incident thereto and a green light being incident thereto without any polarization conversion toward the projection lens 50. The third PBSP 44C can be replaced by a Dichroic prism. The projection lens 50 projects the combined picture inputted from the third PBSP 44C onto the screen on an expanded scale.

Figure 1:
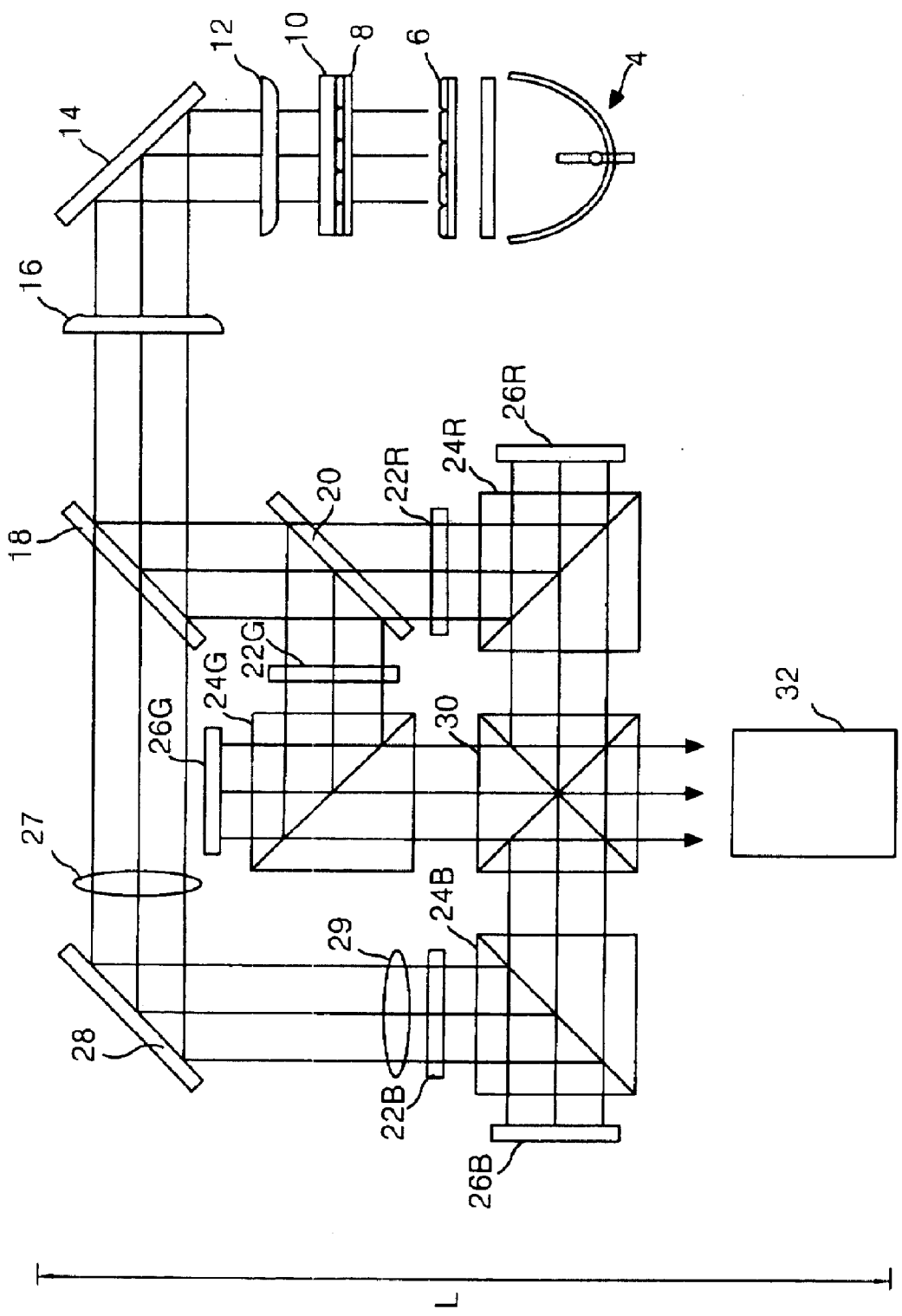
FIG. 1 is a plan view showing a configuration of an optical system of a conventional liquid crystal projector.

As described above, the optical system of the liquid crystal projector according to the embodiment of the present invention employs the color selectors for making a selective polarization conversion according to a wavelength area, to thereby reduce the number of PBSP's differentiating paths of input and output lights of the Dichroic mirrors for a light separation and the LCD panels. Accordingly, it can reduce the number of optical elements and the size of optical system. Particularly, the present optical system is capable of more reducing a full length L' of the optical system than a full length L of the conventional optical system shown in FIG. 1, to thereby reduce the thickness of the liquid crystal projector.

The optical system of the liquid crystal projector according to the embodiment of the present invention further includes a third color selector 42C between the third PBSP 44C and the projection lens 50 so as to allow polarization components of all lights being incident to the projection lens unit 50 to be a P wave. The third color selector 42C rotates only a blue S-polarized light reflected from the third PBSP 44C and being incident thereto at 90° to convert it into a P wave while transmitting red and green P-polarized lights going through the third PBSP 44C as it is.

If a P-polarization screen transmitting only a P-polarized light is applied to the projective screen for allowing polarization components of all lights being incident to the projection lens 50 to be consistently P-polarized lights and imaging a picture enlarged by means of the projection lens 50, it becomes possible to improve a contrast of picture. Because the P polarizer adopted for the projective screen can absorb an external light.

Figure 4:
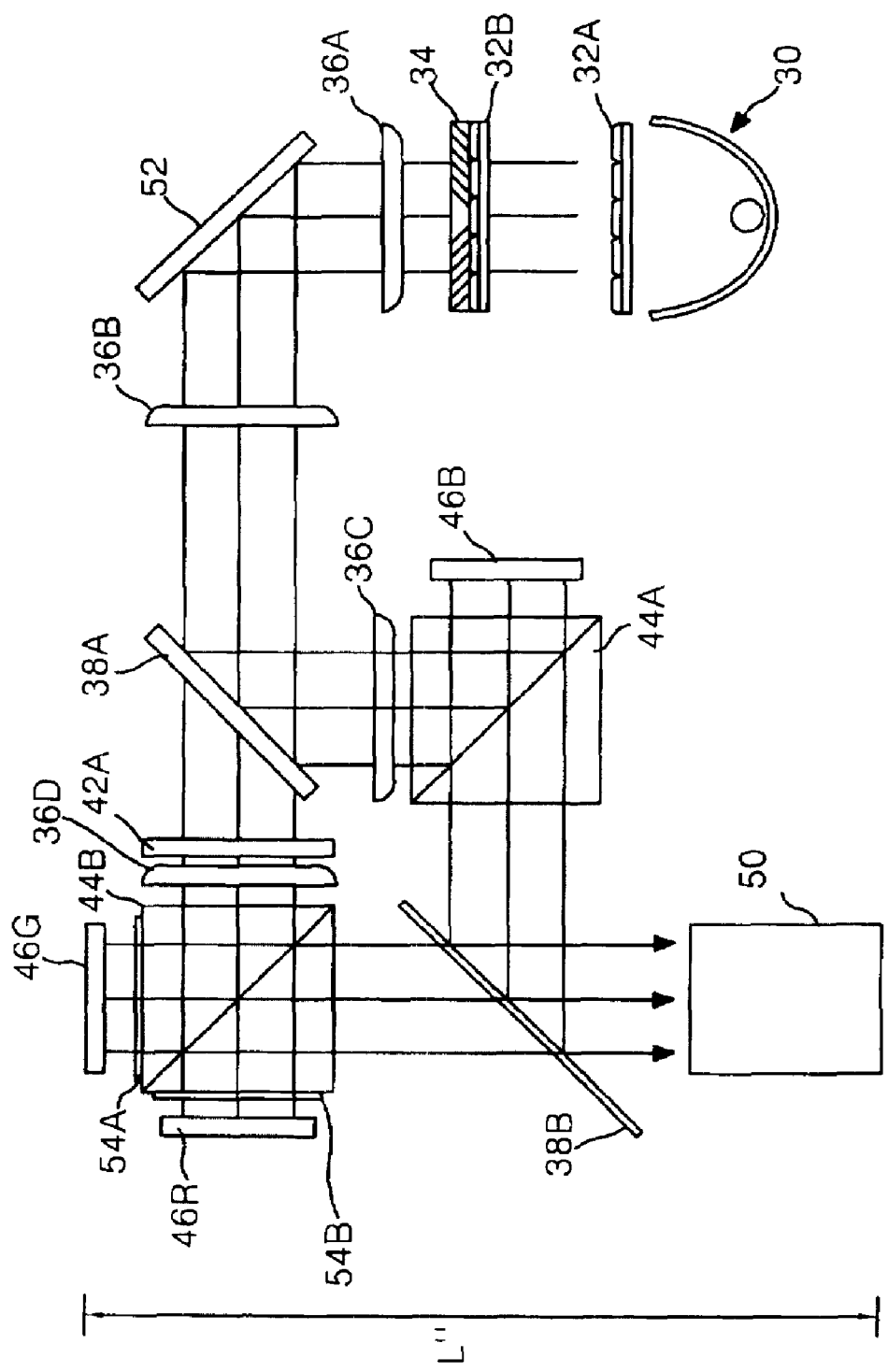
FIG. 4 is a plan view showing a configuration of an optical system of a liquid crystal projector according to another embodiment of the present invention.

Referring to FIG. 4, there is shown an optical system of a liquid crystal projector according to another embodiment of the present invention.

When compared with the optical system shown in FIG. 2, the optical system of FIG. 4 uses a second Dichroic mirror 38B, instead of the third PBSP 44C, as a combining unit, and further includes green and red color filters 54A and 54B provided between the red and green LCD panels 46R and 46G and the second PBSP 44B to enhance a color purity and a full-reflecting mirror 52 provided between the light source 30 and the first Dichroic mirror 38A to change a light path. Also, the optical system shown in FIG. 4 excludes the polarizing filters 40A, 40B and 40C, but may additionally include them. Herein, a detailed explanation as to elements of the optical system of FIG. 4 identical to the optical system shown in FIG. 2 will be omitted.

First and second FEL's 32A and 32B, a PBS array 34 and first and second condensing lenses 36A and 36B allow a white light from the light source 30 to be uniformly and efficiently irradiated onto red, green and blue LCD panels 46R, 46G and 46B. The full-reflecting mirror 52 full-reflects an incident light from the first condensing lens 36A to progress it toward the second condensing lens 36B.

A first Dichroic mirror 38A reflects a S-polarized light at the blue color area and allows it to be irradiated, via a third condensing lens 36C and a first PBSP 44A, onto the blue LCD panel 46B. Further, the first Dichroic mirror 38A transmits S-polarized lights at the red and green color area having a larger wavelength than a light at the blue color area and allows them to be incident to the red and green LCD panels 46R and 46G via a first color selector 42A, a fourth condensing lens 36D and a second PBSP 44A.

The first color selector 42A rotates a S-polarized light at the blue area at 90° as mentioned above to convert it into a P-polarized light, thereby allowing it to be transmitted to the second PBSP 44B and to be incident to the red LCD panel 46R. Further, the first color selector 42A transmits a light at the green area with keeping a S-polarized light as it is, thereby allowing it to be reflected from the second PBSP 44B and to be incident to the green LCD panel 46G.

The red and green color filters 54A and 54B installed at the second PBSP 44B in opposition to the red and green LCD panels 46R and 46G improve purities of red and green colors, respectively.

The second Dichroic mirror 38B transmits a red light converted into a S-polarized light by acquiring picture information from the red LCD panel 46R and being incident thereto and a green light converted into a P-polarized light by acquiring picture information from the green LCD panel 46G and being incident thereto toward the projection lens 50. Further, the second Dichroic mirror 38B reflects a blue light converted into a P-polarized light by acquiring picture information from the blue LCD panel 46B and being incident thereto into the projection lens 50. As described above, the second Dichroic mirror 38B combines red, green and blue lights acquiring picture information and allows the combined light to be progressed toward the projection lens 50.

The projection lens unit 50 projects the combined picture inputted from the second Dichroic mirror 38B onto the screen on an expanded scale.

As described above, the optical system of the liquid crystal projector according to another embodiment of the present invention employs the color selectors for making a selective polarization conversion according to a wavelength area, to thereby reduce the number of Dichroic mirrors for a light separation and the number of PBSP's for a light combination. Accordingly, it can reduce the number of optical elements and the size of optical system. Particularly, the present optical system is capable of more reducing a full length L" of the optical system than a full length L of the conventional optical system shown in FIG. 1, to thereby reduce the thickness of the liquid crystal projector.

As described above, according to the present invention, the color selectors for making a polarization conversion according to a wavelength are used to the number of optical elements such as the Dichroic mirror and the PBSP, so that it becomes possible to simplify the optical system and thus reduce the size of the optical system. Particularly, a full length of the optical system of the liquid crystal projector can be reduced to make the projector having a thin thickness.

In addition, according to the present invention, the P-polarization screen is adopted and the color selectors convert all light being incident to the projection lens unit into P-polarized lights, so that it becomes possible to improve a contrast of picture.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical system for a liquid crystal projector, comprising:

an illuminating portion for allowing a white light from a light source to have a linear polarized light and a uniform light distribution;

a dichroic mirror for filtering a first color light;

a first color selector for polarization-converting any one of second color light and third color light passing through the dichroic mirror;

a first polarizing beam splitter prism having a polarizing beam splitter surface transmitting or reflecting the second color light and the third color light in accordance with a polarization direction of the first color selector;

a first liquid crystal display panel;

a second liquid crystal display panel, to which the transmitted color light is inputted;

a third liquid crystal display panel, to which the reflected color light is inputted;

a second color selector for polarization-converting any one of combined second color light and the third color light, the second and third color lights polarization-converted in accordance with picture information from the second and third liquid crystal display panels being transmitted or reflected through the polarizing beam splitter surface and combined;

a second polarizing beam splitter prism having a polarizing beam splitter surface for reflecting the first color light reflected by the dichroic mirror, the reflected first color light being inputted to the first liquid crystal display panel;

a third polarizing beam splitter prism having a polarizing beam splitter surface for reflecting the first color light polarization-converted in accordance with picture information from the first liquid crystal display panel and transmitted through the polarizing beam splitter surface of the second polarizing beam splitter prism, and transmitting the second color light and third color light inputted through the second color selector, and for combining the first color light, the second color light, and the third color light; and a projection lens for expanding and projecting the combined light.

2. The optical system of claim 1, further comprising:
third color selector for polarization-converting any one of the first color light, the second color light, and the third color light to the front surface of the projection lens.

3. The optical system of claim 2, wherein the third color selector is configured to polarized-convert the blue color light and transmit remaining color light as it is.

4. The optical system of claim 1, wherein each of the first, second and third liquid crystal display panels is a reflective liquid crystal display panel.

5. The optical system of claim 1, wherein the dichroic mirror is designed to reflect blue color light and transmit red and green color lights.

6. The optical system of claim 5, wherein the first color selector and second color selector are configured to polarization-convert the red color light, and transmit the green color light as it is.

7. The optical system of claim 1, wherein a light incident surface of at least one of the first polarizing beam splitter prism and the second polarizing beam splitter prism is provided with a condensing lens to focus an incident light.

8. The optical system of claim 1, wherein a light incident surface of at least one of the first polarizing beam splitter prism and the second polarizing beam splitter prism is provided with a polarizer to enhance purity of polarization of an incident light.

9. The optical system of claim 1, wherein a light output surface of the second polarizing beam splitter prism is provided with a polarizer to enhance a purity of polarization, and a half wavelength plate to convert the polarization of output light from the second polarization beam splitter prism.

10. An optical system of a liquid crystal projector, comprising:

an illuminating unit for allowing a white light generated from a light source to have any one linear polarized light and a uniform light distribution;

a color separator for separating the white light from the illuminating unit in accordance with a wavelength band to obtain a first color light and for polarization-converting the remaining lights in accordance with a wavelength band and then separating them into second and third color lights depending on their polarization components;

first to third liquid crystal display panels using the first to third color lights from the color separator to implement first to third color pictures, respectively;

a picture combining unit for combining the first to third color lights having acquired picture information from the first to third liquid crystal display panels, a projection lens unit for projecting the combined picture from the picture combining unit onto a screen on an expanded scale; and a half wavelength plate for converting a linear polarized light of the first color light having acquired the picture information from a first polarizing prism and allowing it to be progressed toward any one of a second polarized light separating prism and a Dichroic prism, wherein the picture combining unit further comprises any one of the second polarized light separating prism and the Dichroic prism for acquiring picture information from the first to third liquid crystal display panels to combine the first to third color lights being incident thereto via first and third polarized light separating prisms and output the combined light, and a first color selector for selectively converting polarization components of the second and third color lights outputted from the third polarized light separating prism in accordance with a wavelength band and allowing it to be progressed toward any one of the second polarized light separating prism and the Dichroic prism in the same linear polarization state.

11. The optical system as claimed in claim 10, further comprising:

a second color selector for polarization-converting the combined picture from the picture combining unit in accordance with a wavelength band and allowing it to be progressed toward the projection lens.

12. The optical system as claimed in claim 11, wherein the second color selector allows all lights going between the picture combining unit and the projection lens unit to be converted into P-polarized lights when a P-polarization screen for transmitting only a P-polarized light is applied to said screen.

* * * * *